(12) United States Patent
Fukasu et al.

(10) Patent No.: US 9,221,659 B2
(45) Date of Patent: Dec. 29, 2015

(54) LOADING SYSTEM AND TRANSPORTER

(75) Inventors: Hisataka Fukasu, Fujisawa (JP); Tadashi Taninaga, Fujisawa (JP); Takashi Itoi, Hiratsuka (JP); Takahiro Ueda, Maebashi (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 13/821,037

(22) PCT Filed: Sep. 14, 2012

(86) PCT No.: PCT/JP2012/073730
§ 371 (c)(1),
(2), (4) Date: Mar. 6, 2013

(87) PCT Pub. No.: WO2013/065415
PCT Pub. Date: May 10, 2013

(65) Prior Publication Data
US 2014/0231153 A1     Aug. 21, 2014

(30) Foreign Application Priority Data
Nov. 4, 2011   (JP) .................................. 2011-242846

(51) Int. Cl.
*G01G 19/08* (2006.01)
*B66F 17/00* (2006.01)
(Continued)

(52) U.S. Cl.
CPC . *B66F 17/00* (2013.01); *B60P 1/00* (2013.01); *E02F 9/2029* (2013.01); *E02F 9/26* (2013.01); *G01G 19/08* (2013.01)

(58) Field of Classification Search
CPC ... G01G 19/08; G01G 19/083; G01G 19/086; G01G 19/10; G01G 19/12; B60G 2400/60; B60G 2400/64; B60G 2204/11; B66F 17/00; E02F 9/2029; E02F 9/26; B60P 1/00

USPC ............ 177/1, 25.12, 25.13, 25.19, 136–141, 177/145–149; 702/173–175
See application file for complete search history.

(56) References Cited

U.S. PATENT DOCUMENTS 4,635,739 A *  1/1987  Foley et al. ...................... 177/45
4,831,539 A *  5/1989  Hagenbuch .................. 701/33.4
(Continued)

FOREIGN PATENT DOCUMENTS

| JP | 2008-240461 A | 10/2008 |
| WO | WO-03/033829 A1 | 4/2003 |
| WO | WO-2011/090077 A1 | 7/2011 |

OTHER PUBLICATIONS

Office Action dated Oct. 4, 2013, issued for the corresponding Canadian patent application No. 2,807,828.

(Continued)

*Primary Examiner* — Peter Macchiarolo
*Assistant Examiner* — Natalie Huls
(74) *Attorney, Agent, or Firm* — Locke Lord LLP

(57) ABSTRACT

A loading system that includes a transporter and a loader or a transporter is provided. It includes a load-amount measuring unit installed on the transporter that measures a load amount of an object loaded on the transporter; a difference computing unit computing a difference between the load amount measured by the load-amount measuring unit when the object is loaded, and a load amount measured by the load-amount measuring unit after a measurement when the object is loaded and at a time of traveling; a storage unit storing a difference value data indicating the difference computed by the difference computing unit; a correcting unit correcting the load amount measured by the load-amount measuring unit when the object is loaded, based on a correction rule calculated based on the difference value data stored in the storage unit; and a display unit displaying a corrected load amount obtained by correcting the load amount.

15 Claims, 11 Drawing Sheets

(51) Int. Cl.
  *E02F 9/26*     (2006.01)
  *E02F 9/20*     (2006.01)
  *B60P 1/00*     (2006.01)

(56) References Cited

U.S. PATENT DOCUMENTS

| | | | |
|---|---|---|---|
| 4,835,719 A * | 5/1989 | Sorrells | 702/174 |
| 4,852,674 A * | 8/1989 | Gudat | 177/141 |
| 4,921,578 A * | 5/1990 | Shiraishi et al. | 177/25.19 |
| 4,981,186 A * | 1/1991 | Shankle et al. | 177/141 |
| 5,742,914 A * | 4/1998 | Hagenbuch | 701/29.6 |
| 5,822,224 A * | 10/1998 | Nakanishi et al. | 702/174 |
| 8,527,158 B2 * | 9/2013 | Faivre et al. | 701/50 |
| 2005/0000703 A1 | 1/2005 | Furuno et al. | |
| 2005/0167164 A1* | 8/2005 | Takeda | 177/136 |
| 2009/0048790 A1* | 2/2009 | Geraghty et al. | 702/42 |
| 2012/0290178 A1* | 11/2012 | Suzuki et al. | 701/50 |

OTHER PUBLICATIONS

International Search Report dated Dec. 18, 2012, issued for PCT/JP2012/073730 (in Japanese).

* cited by examiner

LOADING SYSTEM AND TRANSPORTER

FIELD

The present invention relates to a loading system that loads an object to be loaded onto a transporter with a loader and a transporter.

BACKGROUND

As a loading system that loads objects to be loaded onto a transporter by a loader, there is a loading system that is provided with an overload prevention system preventing a transporter from being overloaded by a loader. In an overload prevention system disclosed in Patent Literature 1, the transporter determines whether or not a load amount reaches a predetermined value and sends a loading prohibition command to the loader based on a determination result. The loader prohibits the operation of a working unit based on the loading prohibition command.

CITATION LIST

Patent Literature

Patent Literature 1: Japanese Laid-open Patent Publication No. 2008-240461

SUMMARY

Technical Problem

The overload prevention system disclosed in Patent Literature 1 can accurately send the loading prohibition command to the loader by performing communication between the transporter and the loader to send the loading prohibition command to the loader from the transporter. Accordingly, the overload prevention system can prevent the transporter from being overloaded. Here, according to the overload prevention system disclosed in Patent Literature 1, an intended load amount may not correspond to the amount of actually loaded objects even when objects to be loaded are loaded.

Accordingly, an object of the invention is to provide a loading system and a transporter that can more accurately calculate the amount of objects loaded onto a transporter by a loader and notify an operator of the loader of the amount of the loaded objects.

Solution to Problem

To achieve the object mentioned above, according to the present invention, a loading system that includes a transporter and a loader, the loading system comprises: a load-amount measuring unit installed on the transporter that measures a load amount of an object loaded on the transporter; a difference computing unit that computes a difference between the load amount, which is measured by the load-amount measuring unit when the object is loaded, and a load amount that is measured by the load-amount measuring unit after a measurement when the object is loaded and at a time of traveling; a storage unit that stores a difference value data indicating the difference computed by the difference computing unit; a correcting unit that corrects the load amount, which is measured by the load-amount measuring unit when the object is loaded, based on a correction rule calculated based on the difference value data stored in the storage unit; and a display unit that displays a corrected load amount obtained by correcting the load amount by the correcting unit.

As a preferred aspect of the present invention, it is preferable that a difference value is processed based on a plurality of the difference value data stored in the storage unit to determine the correction rule, and the load amount, which is measured by the load-amount measuring unit when the object is loaded, is corrected based on the correction rule.

As a preferred aspect of the present invention, it is preferable that the loading system further comprises: a transporter-side communication section that is installed on the transporter; and a loader-side communication section that is installed on the loader and communicates with the transporter-side communication section, wherein the display unit is installed in a driver's cab of the loader.

As a preferred aspect of the present invention, it is preferable that the correcting unit is installed on the loader, the transporter-side communication section sends information on the load amount, which is measured by the load-amount measuring unit when the object is loaded, to the loader-side communication section, and the loader-side communication section outputs the information on the load amount to the correcting unit.

As a preferred aspect of the present invention, it is preferable that the difference computing unit and the storage unit are installed on the loader, and the transporter-side communication section sends the information on the load amount, which is measured by the load-amount measuring unit when the object is loaded, and the load amount, which is measured by the load-amount measuring unit after the measurement when the object is loaded and at the time of traveling, to the loader-side communication section.

As a preferred aspect of the present invention, it is preferable that the difference computing unit, the storage unit, and the correcting unit are installed on the transporter, and the display unit is installed on any one of the outside of the transporter and a driver's cab of the loader.

As a preferred aspect of the present invention, it is preferable that the loading system further comprises: a pressure sensor that detects a load applied to a suspension cylinder of the transporter, wherein the load-amount measuring unit measures the load amount of the object loaded on the transporter, based on a detection result of the pressure sensor.

As a preferred aspect of the present invention, it is preferable that the loading system further comprises: a position detecting unit on at least one of the transporter and the loader, wherein the difference computing unit assorts the difference values for areas of position information where the load amount is measured when the object is loaded, the storage unit stores the assorted difference values, the correcting unit determines the correction rules for areas of position information where the load amount is measured when the object is loaded, and the correcting unit reads out the difference value corresponding to a loading place, which is detected by the position detecting unit when the object is loaded, from the storage unit to correct the load amount, which is measured by the load-amount measuring unit when the object is loaded.

As a preferred aspect of the present invention, it is preferable that the position detecting unit is installed on the transporter, and the load-amount measuring unit measures the load amount at the time of traveling if the position information detected by the position detecting unit indicates a predetermined position.

As a preferred aspect of the present invention, it is preferable that the load-amount measuring unit determines a measurement timing according to a state of the transporter to measure the load amount at the time of traveling.

As a preferred aspect of the present invention, it is preferable that the display unit displays an evaluation result corresponding to evaluation that is performed by a load-amount determining unit that evaluates the load amount corrected by the correcting unit.

According to the present invention, a transporter on which an object is loaded, the transporter comprises: a load-amount measuring unit that measures a load amount of the loaded object; a difference computing unit that computes a difference between the load amount, which is measured by the load-amount measuring unit, and a load amount that is measured by the load-amount measuring unit after a measurement when the object is loaded and at a time of traveling; a storage unit that stores a difference value data indicating the difference computed by the difference computing unit; a correcting unit that corrects the load amount, which is measured by the load-amount measuring unit when the object is loaded, based on a correction rule calculated based on the difference value data stored in the storage unit.

As a preferred aspect of the present invention, it is preferable that the transporter further comprises an output unit that outputs a corrected load amount obtained by correcting the load amount by the correcting unit.

As a preferred aspect of the present invention, it is preferable that the output unit is a display unit that displays the corrected load amount.

As a preferred aspect of the present invention, it is preferable that the output unit is a communication section that outputs the corrected load amount to an outside.

As a preferred aspect of the present invention, it is preferable that the communication section outputs the corrected load amount to a loader that loads the object.

DESCRIPTION OF EMBODIMENTS

A loading system and a loader according to the invention will be described below with reference to the accompanying drawings. Meanwhile, the invention is not limited by the following embodiment. Further, components that can be easily substituted by those skilled in the art or substantially the same components are included in components of the following embodiment.

<Structure of the Entire Loading System>

Figure 1:
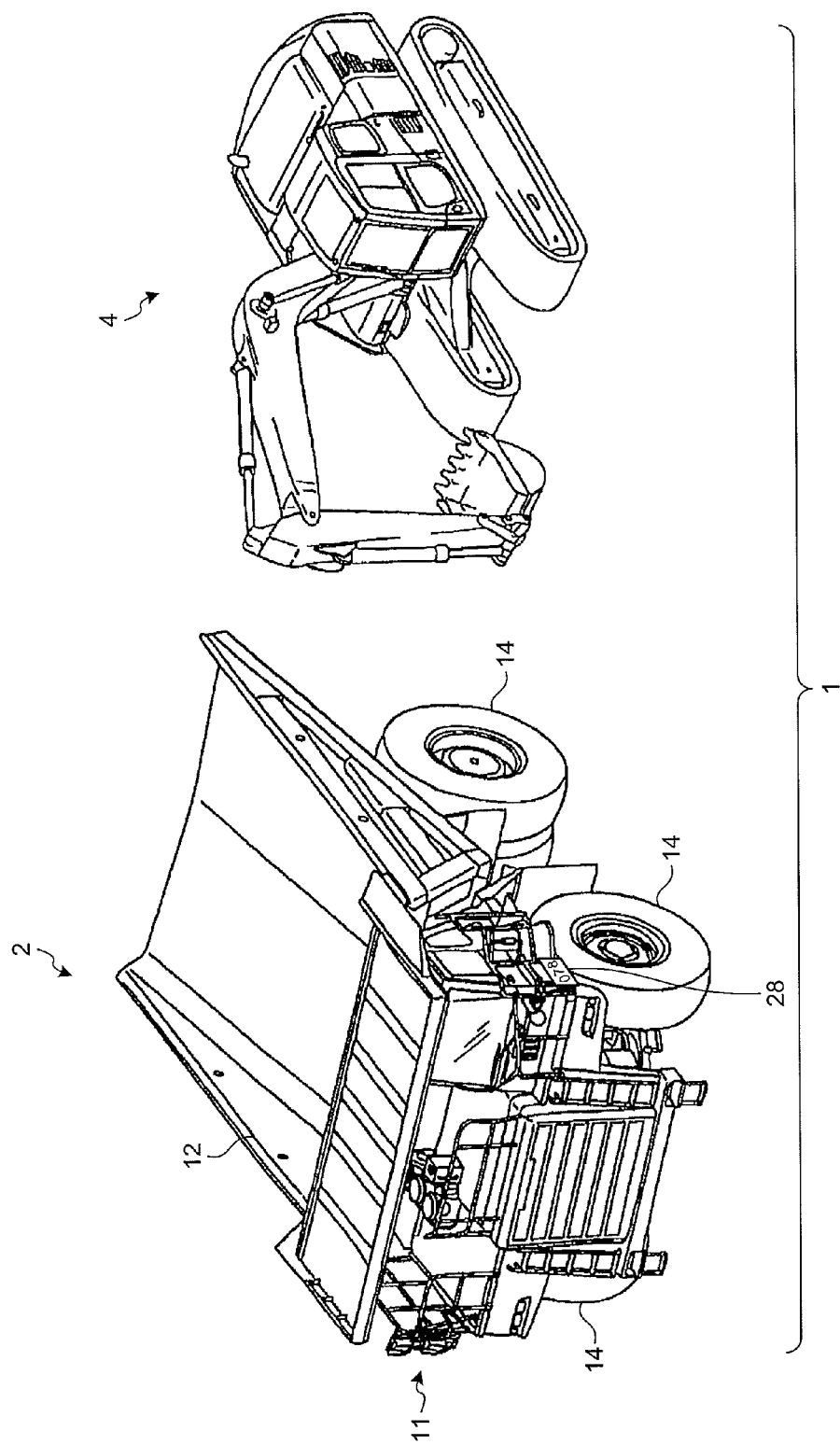
FIG. 1 is a schematic view schematically illustrating of a loader and a transporter of a loading system.
Figure 2:
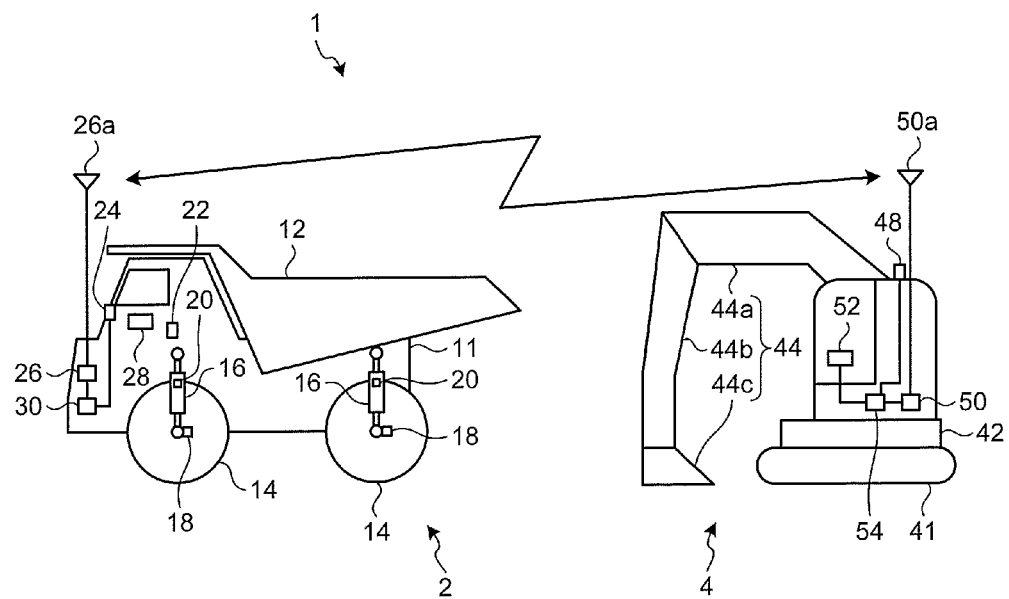
FIG. 2 is a view illustrating the schematic structure of each part of the loading system illustrated in FIG. 1.

FIG. 1 is a schematic view schematically illustrating of a loader and a transporter of a loading system. FIG. 2 is a view illustrating the schematic structure of each part of the loading system illustrated in FIG. 1. As illustrated in FIGS. 1 and 2, a loading system 1 includes a transporter 2 and a loader 4. Meanwhile, the loading system 1 illustrated in FIGS. 1 and 2 includes one transporter 2 and one loader 4, but the number of the transporters and the number of the loaders are not limited. The loading system 1 may include a plurality of transporters 2 and a plurality of loaders 4.

The transporter 2 is, for example, a dump truck, and can load objects to be loaded (freight) thereon and travel. The transporter 2 includes a vehicle body 11, a vessel 12, wheels 14, suspension cylinders 16, rotation sensors 18, suspension pressure sensors (pressure sensors) 20, a clinometer 22, a GPS antenna 24, a communicator 26 to which a communication antenna 26a is connected, a display device 28, and a transporter-side in-vehicle device 30. Meanwhile, the transporter 2 has various mechanisms and functions of a general transporter other than the above-mentioned structure.

The vehicle body 11 is a vehicle that consumes fuel in an engine to generate power and uses electric power in a travel motor (hereinafter, referred to as a motor) to generate power. Specifically, the vehicle body 11 is provided with the engine, a generator, and a motor, and the engine and the generator are mechanically connected to each other. The vehicle body 11 generates electric power by driving the generator with the power of the engine, and the generated electric power is supplied to the motor. Accordingly, the vehicle body 11 can travel by transmitting the power, which is generated by the motor, to the wheels 14. Meanwhile, the vehicle body 11 may be provided with only the engine, and may be adapted to be capable of traveling by transmitting the power of the engine to the wheels 14. The vessel 12 is to load freight thereinto and is disposed at the upper portion of the vehicle body 11. Mined broken stone, rock, earth, or the like is loaded as freight into the vessel 12. Meanwhile, the vessel 12 may be detachably mounted on the vehicle body 11. The wheels 14 are formed of wheels and tires, are mechanically mounted on a travel mechanism of the vehicle body 11, and are rotated when power is transmitted from the vehicle body 11 as described above. The wheels 14 form a contact area where the transporter is installed on the ground surface. The suspension cylinder 16 is provided between the wheel 14 and the vehicle body 11. A load corresponding to the weight of the vehicle body 11 and the vessel 12 and a load corresponding to the weight of freight when the freight is loaded are applied to the wheels 14 through the suspension cylinders 16.

The rotation sensor 18 detects the rotational speed of the wheel. The suspension pressure sensor (hereinafter, simply referred to as a "pressure sensor") 20 detects a load that is applied to the suspension cylinder 16. When objects to be loaded are loaded into the vessel 12, the suspension cylinder 16 contracts according to the amount of the loaded objects and the pressure of hydraulic oil sealed in the suspension cylinders is increased. The pressure sensor 20 detects the change of the pressure of the hydraulic oil of the suspension cylinder, and measures the amount of the loaded objects by converting a hydraulic pressure detection signal into a weight value. Meanwhile, the pressure sensor 20 is installed on each of the suspension cylinders 16 of the transporter 2. That is, in the case of the dump truck illustrated in FIG. 1, the pressure sensor 20 is installed on each of the suspension cylinders 16 of the four wheels 14. A total of six pressure sensors are installed in the case of a transporter 2 such as an articulated dump truck including six wheels. The clinometer 22 detects the inclination of the vehicle body 11, specifically, the inclination of the vehicle body 11 with respect to the vertical direction. The rotation sensors 18, the pressure sensors 20, and the clinometer 22 output detected values to the transporter-side in-vehicle device 30. Meanwhile, a certain dump truck includes one wheel 14 as each of left and right front wheels and includes two wheels as each of left and right rear wheels. That is, there is a dump truck where the rear wheels 14 include a total of four tires on the left and right sides. Accordingly, in the case of such a dump truck, as for the number of the suspension cylinders 16 provided on the above-mentioned respective wheels 14, one suspension cylinder 16 is provided on each of the left and right front wheels 14 and one suspension cylinder 16 is provided on each of the left and right rear wheels 14. As a result, a total of four suspension cylinders 16 are provided even in this dump truck. Further, the number of the suspension cylinders 16 in the case of an articulated dump truck is not limited to the above-mentioned six, and one suspension cylinder 16 is provided on each of the left and right rear wheels 14. As a result, this embodiment can be applied to a structure where a total of four suspension cylinders 16 are provided in the entire articulated dump truck. Furthermore, a support structure, which mechanically connects the vehicle body to the vessel, of the articulated dump truck may be used as a structure that supports the total weight of objects to be loaded by one of the four rear wheels 14, and one suspension cylinder 16 and one pressure sensor 20 may be provided at one support portion of them to measure the weight of the objects to be loaded. In this case, each of the wheels 14, which is not provided with the suspension cylinders 16, has a suspension structure, which includes a spring or a damper, without being provided with unit, such as the pressure sensors 20, for measuring objects to be loaded.

The GPS antenna 24 receives signals output from GPS satellites, which form a GPS (Global Positioning System), and measures its own position. The GPS antenna 24 receives signals output from a plurality of GPS satellites. The GPS antenna 24 outputs the received signals to the transporter-side in-vehicle device 30. Meanwhile, the GPS antenna may use other positioning satellites without using the GPS satellites in order to measure its own position. That is, a position may be measured using GNSS (Global Navigation Satellite Systems). The same is applied to the loader 4 to be described below.

The communicator (communication section, transporter-side communication section) 26 sends and receives data to and from the loader 4 through the communication antenna 26a. The communicator 26 is also connected to the transporter-side in-vehicle device 30. The communicator 26 sends data, which are output from the transporter-side in-vehicle device 30, to the loader 4 through the communication antenna 26a. Further, the communicator 26 receives data, which is output from the loader 4, through the communication antenna 26a and outputs the received data to the transporter-side in-vehicle device 30. Meanwhile, various communication forms, such as wireless LAN communication, infrared communication, satellite wave communication, or ground wave communication using a mobile phone communication network, are suitably selected as the form of communication according to the maintenance condition of communication infrastructure, and corresponding communicators or the like are provided.

The display device 28 is installed on the surface of the vehicle body 11 as illustrated in FIG. 1. That is, the display device 28 is installed at a position that can be visually recognized from the outside, specifically, from the driver's seat of the loader 4 by an operator of the loader 4 when the loader 4 loads objects to be loaded thereinto. The display device 28 switches a display form based on a command signal that is output from the transporter-side in-vehicle device 30. The structure and the like of the display device 28 will be described below. The transporter-side in-vehicle device 30 is a controller such as a microcomputer unit. The transporter-side in-vehicle device 30 controls the operation of each part of the transporter 2. The transporter-side in-vehicle device 30 will be described below.

Next, the loader 4 is an excavator, a wheel loader, or the like and is a machine that has a function of loading objects to be loaded onto the transporter 2. If the loader 4 is a crawler type excavator, the loader 4 includes crawler belts 41, an upper turning body 42, a working unit 44, a GPS antenna 48, a communicator 50 to which a communication antenna 50a is connected, a display device 52, and a loader-side in-vehicle device 54. Meanwhile, the loader 4 has various mechanisms and functions of a general loader other than the above-mentioned structure.

An engine, a hydraulic pump, a right travel motor, a left travel motor, a turning motor, and hydraulic cylinders are mounted on the loader 4. Further, the crawler belts 41 are provided on the left and right sides so as to make a pair, and form a lower travel body. The pair of (left and right) crawler belts 41 is driven by the right travel motor and the left travel motor, respectively. The hydraulic pump is rotationally driven by the engine and hydraulic oil discharged from the hydraulic pump is supplied to the respective hydraulic motors (the right travel motor and the left travel motor) to drive the crawler belts 41, so that the loader 4 travels. The upper turning body 42 includes a driver's cab provided with an operating seat, a machine room, a counter weight, and the like, and is provided on the lower travel body. The working unit 44 includes a boom 44a, an arm 44b, and a bucket 44c, and is mounted on the upper turning body 42.

In addition, the loader 4 drives the turning motor with the hydraulic oil, which is discharged from the hydraulic pump, to allow the upper turning body 42 to turn relative to the crawler belts 41 in a horizontal plane so that the orientation of the working unit 44 can be moved to an arbitrary direction. The loader 4 rotationally drives the hydraulic pump with a drive force, which is generated in the engine, to supply the hydraulic oil, which is discharged from the hydraulic pump, to the hydraulic cylinders for the boom 44a, the arm 44b, and the bucket 44c so that the respective hydraulic cylinders are driven to extend and contract. Accordingly, the loader 4 performs an intended work, such as excavation or earth removal, by operating the boom 44a, the arm 44b, and the bucket 44c.

The GPS antenna 48 has the same structure as that of the GPS antenna 24, receives signals output from a plurality of GPS satellites, and measures its own position. The GPS antenna 48 outputs the received signals to the loader-side in-vehicle device 54.

The communicator (communication section, loader-side communication section) 50 to which the communication antenna 50a is connected has the same structure as the communicator 26 to which the communication antenna 26a is connected. The communicator 50 sends and receives data to and from the transporter 2 through the communication antenna 50a. The communicator 50 is also connected to the loader-side in-vehicle device 54. The communicator 50 sends data, which is output from the loader-side in-vehicle device 54, to the transporter 2 through the communication antenna 50a. Further, the communicator 50 of the loader 4 receives data, which is output from the transporter 2, through the communication antenna 50a and outputs the received data to the loader-side in-vehicle device 54. Since the loading system 1 is adapted so as to be capable of performing intercommunication by using the communicator 26 of the transporter 2, the communicator 50 of the loader 4, and the like as described above, the loading system 1 can send and receive data between the transporter 2 and the loader 4. The contents of the data will be described in detail below.

The display device 52 is provided near the operating seat in the driver's cab of the upper turning body 42. That is, the display device 52 is provided at a position that is seen from the operator operating the loader 4. The display device 28 switches a display form based on a command signal that is output from the transporter-side in-vehicle device 30. The structure and the like of the display device 28 will be described below. The transporter-side in-vehicle device 30 is a controller such as a microcomputer unit. The transporter-side in-vehicle device 30 controls the operation of each part of the transporter 2. The transporter-side in-vehicle device 30 will be described below.

<Structure of Transporter-Side in-Vehicle Device>

Figure 3:
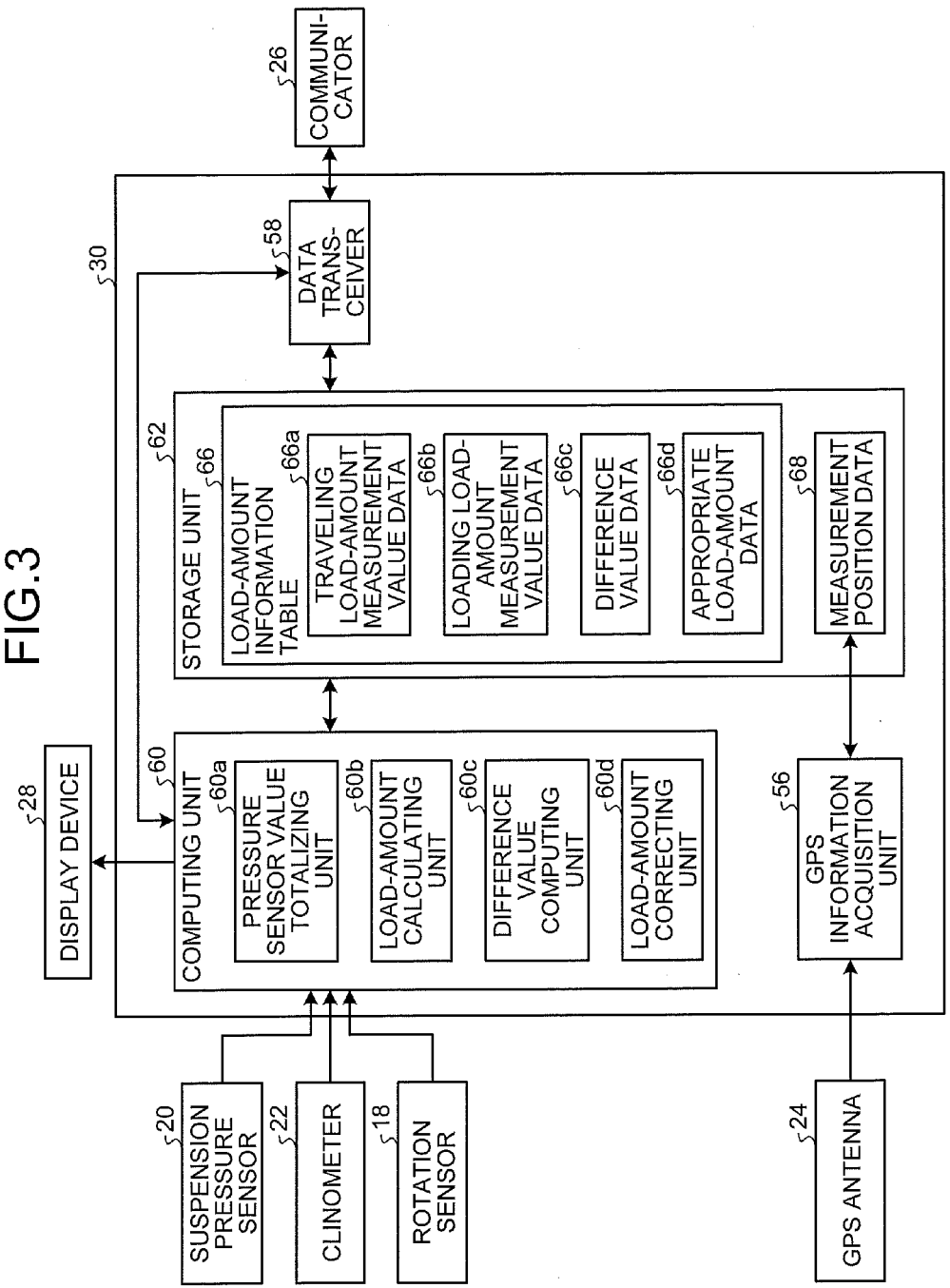
FIG. 3 is a block diagram illustrating a control function of a transporter-side in-vehicle device.

FIG. 3 is a block diagram illustrating a control function of the transporter-side in-vehicle device 30. The transporter-side in-vehicle device 30 will be described below with reference to FIG. 3. The transporter-side in-vehicle device 30 includes a GPS information acquisition unit 56, a data transceiver 58, a computing unit 60, and a storage unit 62.

The GPS information acquisition unit 56 acquires (measures) the current position of the transporter 2 based on the signals that are received by the GPS antenna 24. Specifically, the GPS information acquisition unit 56 receives signals output from a plurality of GPS satellites, respectively, and acquires the current position of the transporter 2 by comparing the plurality of signals. The GPS information acquisition unit 56 stores the acquired position information in the storage unit 62.

The data transceiver 58 is connected to the communicator 26, the computing unit 60, and the storage unit 62. The data transceiver 58 writes the data, which is received by the communicator 26, in a load-amount information table 66 of the storage unit 62 or outputs the data, which is received by the communicator 26, to the computing unit 60. Further, the data transceiver 58 sends the data, which is stored in the load-amount information table 66 of the storage unit 62, or the data, which is generated by the computing unit 60, to the communicator 26.

The computing unit 60 processes various detection values or data, which have been acquired, using a condition or an arithmetic expression that has been set in advance. The computing unit 60 includes a pressure sensor value totalizing unit 60a, a load-amount calculating unit 60b, a difference value computing unit 60c, and a load-amount correcting unit 60d.

The pressure sensor value totalizing unit 60a computes the sum of the detection values that are detected by the respective pressure sensors 20. Here, it is preferable that the pressure sensor value totalizing unit 60a appropriately corrects and computes the detection values, which are detected by the respective pressurem sensors 20, based on a detection value representing the inclination of the vehicle body 11 detected by the clinometer 22 and calculate the sum of the detection values of the pressure sensors 20. When the transporter 2 is positioned on the flat road surface, loads applied to the respective wheels 14 are uniform. However, when the transporter 2 is positioned on the inclined road surface such as a sloping road, loads applied to the respective wheels 14 becomes non-uniform. Accordingly, the detection values of the respective pressure sensors 20 are corrected according to the detection value of the clinometer 22. Further,after computing loads, which are applied to the respective suspension cylinders 16, from the detection values that are detected by the respective pressure sensors 20, the pressure sensor value totalizing unit 60a may calculate the sum of the loads.

The load-amount calculating unit 60b measures the amount of the loaded objects from the detection result of the pressure sensor value totalizing unit 60a, that is, the processing results of the detection values of the pressure sensors 20. That is, the load-amount calculating unit 60b converts a value of the sum of the detection values of the respective pressure sensors 20 into a load amount.

As described above, the transporter 2 forms a load-amount measuring unit, which measures the amount of the objects loaded onto the transporter 2, that is, a load amount, by the combination of the pressure sensors 20, the pressure sensor value totalizing unit 60a, and the load-amount calculating unit 60b. Further, a processing operation will be described below. However, the computing unit 60 measures a load amount when the loader 4 is loading objects to be loaded onto the transporter 2, and measures a load amount when the transporter 2 travels while loading the objects to be loaded. That is, the computing unit 60 measures a load amount two times at the time of loading and at the time of traveling when the same objects to be loaded are loaded onto the loader 4. The computing unit 60 stores a measurement result of the load amount at the time of loading in the storage unit 62 as a loading load-amount measurement value, and stores a measurement result of the load amount at the time of traveling in the storage unit 62 as a traveling load-amount measurement value. Here, the computing unit 60 uses a result, which is measured when the loader 4 has completely loaded objects to be loaded onto the transporter 2 and the transporter 2 stops, as a loading load amount. The computing unit 60 measures a load amount even while the loader 4 is loading objects to be loaded onto the transporter 2. Here, the computing unit 60 can determine whether or not the transporter 2 is traveling or stops, based on the speed of the transporter 2 or the rotational speed of the driven wheel detected by the rotation sensor 18. The computing unit 60 determines that the transporter stops when the detection value of the rotation sensor 18 is zero or the minimum speed, and determines that the transporter is traveling when the detection value of the rotation sensor 18 is not zero or the minimum speed.

The difference value computing unit 60c calculates a difference between a loading load amount and a traveling load amount, which are measured when the same objects to be loaded are loaded onto the loader 4, as a difference value. The difference value computing unit 60c stores the calculated difference value in the storage unit 62.

The load-amount correcting unit 60d calculates a correction rule from various data including the difference value stored in the storage unit 62, and corrects the load amount, which is measured while the loader 4 is loading objects to be loaded onto the transporter 2, based on the calculated correction rule. The load-amount correcting unit 60d sends the corrected load amount to the display device 28, and the display device 28 displays the corrected load amount in a form that can be visually recognized by the operator of the loader 4. Further, the load-amount correcting unit 60d may output the corrected load amount to the loader 4 from the data transceiver 58 through the communicator 26.

The storage unit 62 stores various kinds of information or various programs, such as various data or arithmetic expressions. The storage unit 62 includes a load-amount information table 66, measurement position data 68, and appropriate load-amount data 66*d*. The load-amount information table 66 includes traveling load-amount measurement value data 66*a*, loading load-amount measurement value data 66*b*, difference value data 66*c*, and the appropriate load-amount data 66*d*. The traveling load-amount measurement value data 66*a* stores the measurement result of a traveling load amount among the measurement results of the load amount that are output from the load-amount calculating unit 60*b* of the computing unit 60. The loading load-amount measurement value data 66*b* stores the measurement result of a loading load amount among the measurement results of the load amount that are output from the load-amount calculating unit 60*b* of the computing unit 60. The difference value data 66*c* stores data of a difference value that is calculated by the difference value computing unit 60*c*. The traveling load-amount measurement value data 66*a*, the loading load-amount measurement value data 66*b*, and the difference value data 66*c* may store the result of the latest calculation for one time, and may store the results of calculation for a plurality of times. The appropriate load-amount data 66*d* is a threshold value that is defined to be an index used to determine whether or not a load amount not causing overloading and underloading is loaded according to the specification such as a vehicle class of the transporter 2. Further, the storage unit 62 may delete the past calculation result based on setting or the operation of an operator.

The measurement position data 68 is the position information of the transporter 2 that is acquired by the GPS information acquisition unit 56. It is possible to associate the measurement result of the load amount with a position where the measurement is performed, by storing the position information, which is the measurement position data 68, in association with the measurement result of the load amount. Meanwhile, the measurement position data 68 may store the time when the position information is acquired so that the measurement result of the load amount is associated with the time when the measurement is performed.

<Structure of Display Device of Transporter>

Figure 4:
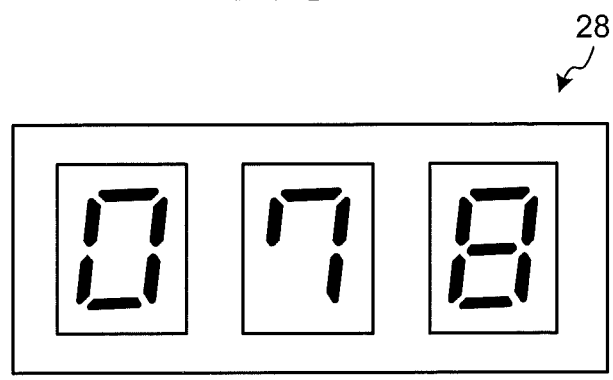
FIG. 4 is a view illustrating an example of a display device of the transporter.

FIG. 4 is a view illustrating an example of the display device 28 of the transporter 2. The display device 28 will be described below with reference to FIG. 4. Since the display device 28 is provided with three columns that display numerical values as illustrated in FIG. 4, the display device 28 can display a three-digit number. The display device 28 displays a numerical value of the corrected load amount that is calculated by the computing unit 60 (a numerical value that is output from the load-amount correcting unit 60*d*). Here, since the display device 28 illustrated in FIG. 4 shows a case where the numerical value of the corrected load amount is 78 ton, "0", "7", and "8" are displayed from the left in this order. The transporter 2 can notify an operator, who operates the loader 4, of the current load amount by displaying the numerical value of the corrected load amount on the display device 28 as described above. A case where the display device 28 illustrated in FIG. 4 displays the numerical value of the corrected load amount has been described here, but the display device is not limited thereto. For example, when overloading is performed as described below, the numerical value of the corrected load amount may be made to flicker, the display color of the numerical value may be made to change, or a letter representing overloading (for example, a letter, such as "O", "V", or "L", meaning overloading) may be displayed to call attention of the operator of the loader 4.

Figure 5:
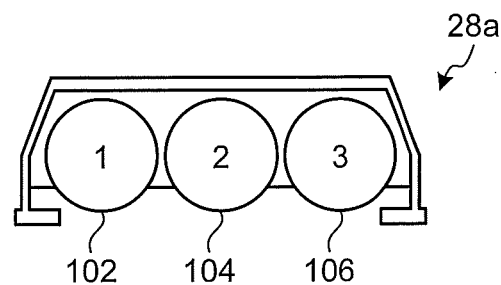
FIG. 5 is a view illustrating another example of the display device of the transporter.
Figure 6:
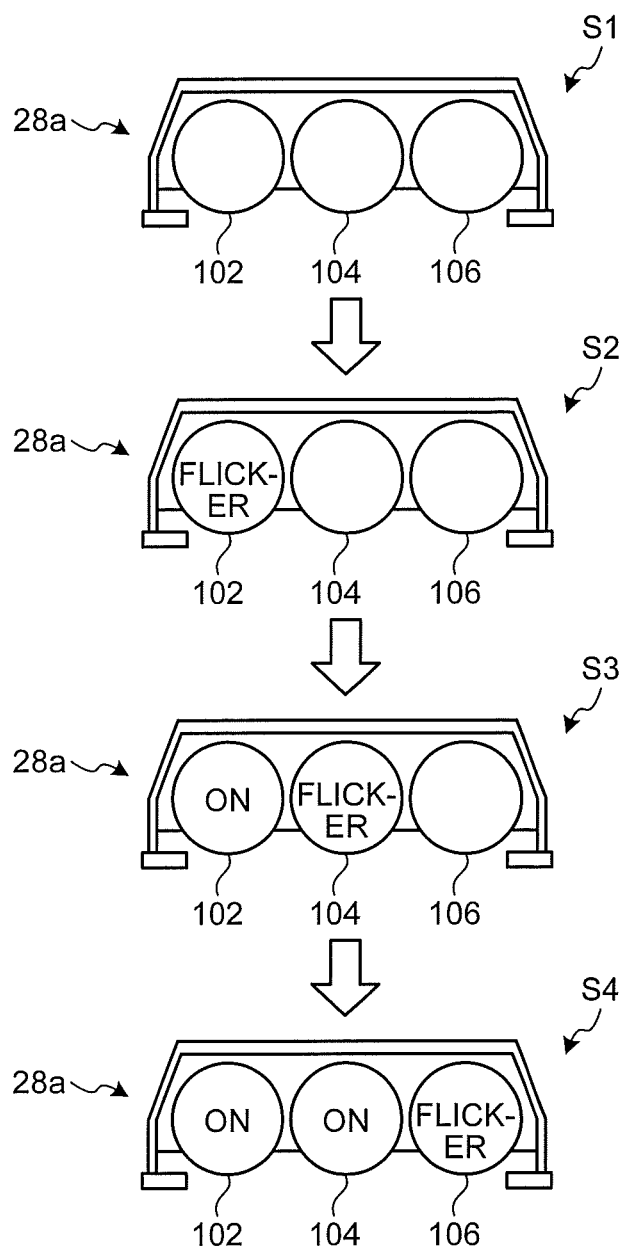
FIG. 6 is a view illustrating an example of a display method of the display device illustrated in FIG. 5.

FIG. 5 is a view illustrating another example of the display device 28 of the transporter 2. FIG. 6 is a view illustrating an example of a display method of a display device 28*a* illustrated in FIG. 5. The display device 28*a* illustrated in FIG. 5 includes three lamps 102, 104, and 106 that can be turned on and off. Here, the three lamps 102, 104, and 106 have different colors when being turned on. For example, the lamp 102 is displayed in green when being turned on, the lamp 104 is displayed in yellow when being turned on, and the lamp 106 is displayed in red when being turned on. Even in the display device 28*a*, it is possible to notify the operator of the loader 4 of the current load amount by turning on and off the lamps 102, 104, and 106 according to the numerical value of the corrected load amount.

Here, the display device 28*a* can notify the state of a load amount in four levels. Here, the four levels can be divided by, for example, whether or not a load amount is significantly smaller than a criterion (appropriate load amount), whether or not a load amount is smaller than a criterion, whether or not a load amount is appropriate, and whether or not a load amount is larger than a criterion. The display device 28*a* turns off all the lamps 102, 104, and 106 as illustrated in step S1 when a load amount is significantly smaller than a criterion. After that, when objects to be loaded are loaded onto the transporter 2 so that a load amount is smaller than a criterion, the display device 28 makes the lamp 102 flicker and turns off the lamps 104 and 106 as illustrated in step S2. Then, when objects to be loaded are loaded onto the transporter 2 so that a load amount is appropriate, the display device 28 turns on the lamp 102, makes the lamp 104 flicker, and turns off the lamp 106 as illustrated in step S3. Subsequently, when objects to be loaded are loaded onto the transporter 2 so that a load amount is larger than a criterion, the display device 28 turns on the lamps 102 and 104 and makes the lamp 106 flicker as illustrated in step S4. As described above, the display device 28*a* may notify the operator of the loader 4 of the current load amount in a display form, which shows the state of a load amount, without directly displaying a numerical value of a load amount.

<Structure of Loader-Side in-Vehicle Device>

Figure 7:
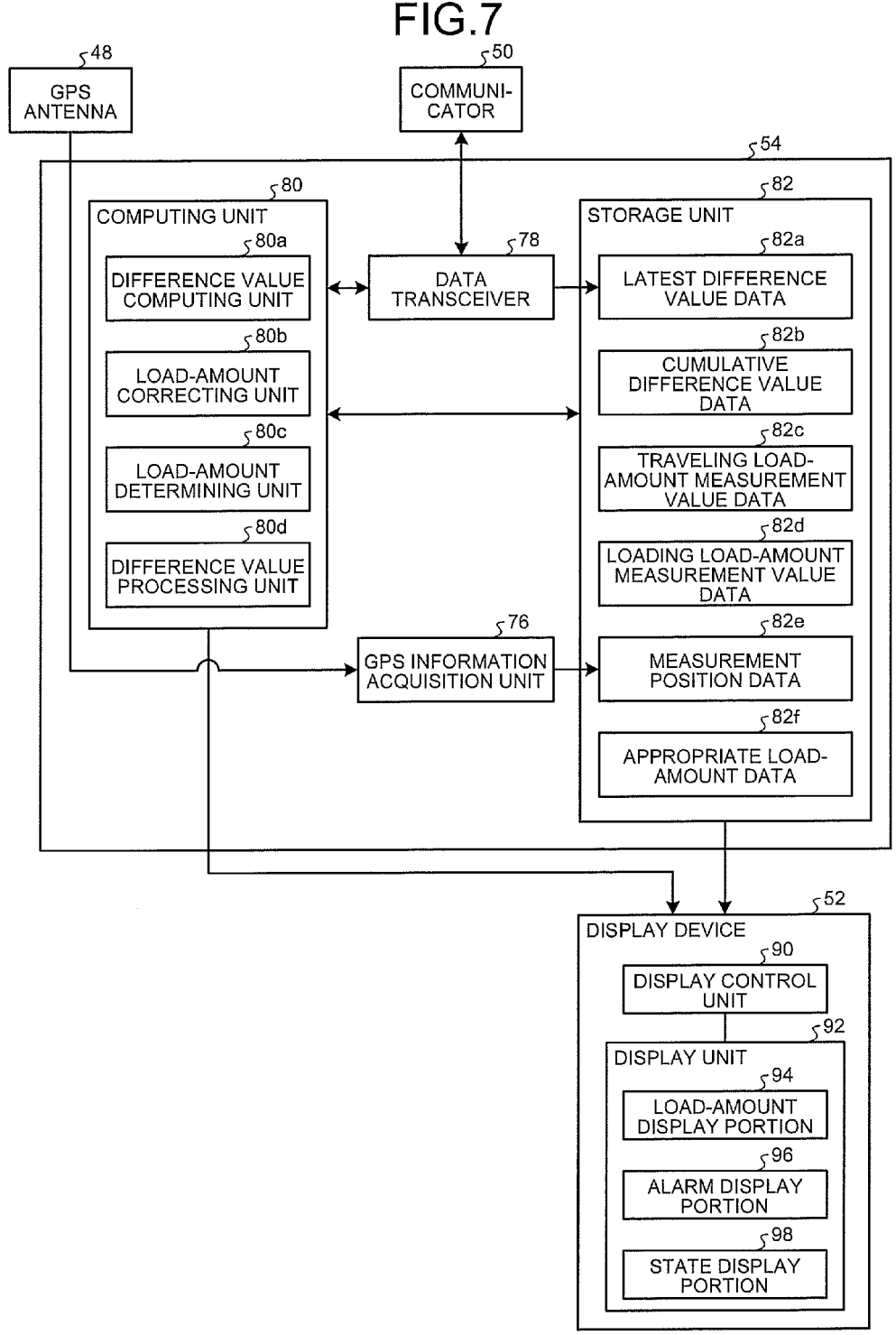
FIG. 7 is a block diagram illustrating a control function of a loader-side in-vehicle device.

FIG. 7 is a block diagram illustrating a control function of the loader-side in-vehicle device 54. The loader-side in-vehicle device 54 will be described below with reference to FIG. 7. The loader-side in-vehicle device 54 includes a GPS information acquisition unit 76, a data transceiver 78, a computing unit 80, and a storage unit 82.

The GPS information acquisition unit 76 acquires the current position of the loader 4 based on the signals that are received by the GPS antenna 24. Meanwhile, a method of acquiring the current position is the same as that of the above-mentioned GPS information acquisition unit 56. The GPS information acquisition unit 76 stores the acquired position information in the storage unit 82.

The data transceiver 78 is connected to the communicator 50, the computing unit 80, and the storage unit 82. The data transceiver 78 writes the data, which is received by the communicator 50, in the storage unit 82 or outputs the data, which is received by the communicator 50, to the computing unit 80. Further, the data transceiver 78 sends the data or programs, which are stored in the storage unit 82, or the data, which are generated by the computing unit 80, to the communicator 50 or the computing unit 80.

As described below, the computing unit 80 computes various detection values or data, which have been acquired, using a condition or an arithmetic expression that has been set in advance. The computing unit 80 includes a difference value computing unit 80*a*, a load-amount correcting unit 80*b*, a load-amount determining unit 80*c*, and a difference value processing unit 80*d*.

The difference value computing unit 80a has the same function as the above-mentioned difference value computing unit 60c, and calculates a difference between a loading load amount and a traveling load amount, which are measured when the same objects to be loaded are loaded onto the loader 4, as a difference value. The difference value computing unit 80a stores the calculated difference value in the storage unit 82.

The load-amount correcting unit 80b has the same function as the above-mentioned load-amount correcting unit 60d; calculates a correction rule from various data including the difference value stored in the storage unit 82; and corrects the load amount, which is measured while the loader 4 is loading objects to be loaded onto the transporter 2, based on the calculated correction rule. The load-amount correcting unit 80b sends the corrected load amount to the display device 52. Further, the load-amount correcting unit 80b may output the corrected load amount to the transporter 2 from the data transceiver 78 through the communicator 50.

The load-amount determining unit 80c determines whether or not the corrected load amount calculated by the load-amount correcting unit 80b is an appropriate value. The load-amount determining unit 80c can determine whether or not the corrected load amount is an appropriate value, by comparing the corrected load amount, which is calculated by the load-amount correcting unit 80b, with appropriate load-amount data 82f that is stored in the storage unit 82 (or the appropriate load-amount data 66d that is stored in the storage unit of the transporter 2).

The difference value processing unit 80d processes the difference value that is calculated by the difference value computing unit 80a. Specifically, the load-amount correcting unit 80b processes a difference value that is used as a criterion for determining a correction rule. Difference values for a plurality of times, which are calculated by the difference value computing unit 80a, are read, and the difference values for the plurality of times and an averaged difference value are used as difference values that are used as criterion for determining the correction rule. Further, difference values for a plurality of times, which are calculated by the difference value computing unit 80a, may be read; orders where difference values are obtained or weighting corresponding to the magnitudes of the difference values may be performed; and a difference value, which is highly weighted, may be selected as a difference value, which is used as a criterion for determining a correction rule, from these difference value.

The storage unit 82 stores various kinds of information or various programs, such as various data or arithmetic expressions. The storage unit 82 includes latest difference value data 82a, cumulative difference value data 82b, traveling load-amount measurement value data 82c, loading load-amount measurement value data 82d, measurement position data 82e, and appropriate load-amount data 82f. The latest difference value data 82a stores data of the latest difference value that is calculated by the difference value computing unit 80a. Meanwhile, the latest difference value data 82a may store a difference value that is processed by the difference value processing unit 80d. The cumulative difference value data 82b stores data of difference values (data of difference values for a plurality of times) that were calculated in the past by the difference value computing unit 80a. The cumulative difference value data 82b is used when a difference value is processed by the difference value processing unit 80d. The traveling load-amount measurement value data 82c stores the measurement result of a traveling load amount among the measurement results of a load amount output from the transporter 2. The loading load-amount measurement value data 82d stores the measurement result of a loading load amount among the measurement results of a load amount output from the transporter 2. Further, the storage unit 82 may delete the past calculation result based on setting or the operation of an operator. Furthermore, the appropriate load-amount data 82f is a value that varies by each transporter 2. The appropriate load-amount data 82f is stored in advance according to the kind or a vehicle class of the transporter 2 onto which the loader 4 loads objects. An appropriate load amount for bearing a load caused by loading is set when the transporter 2 is designed, and the appropriate load amount varies by the kind or a vehicle class of the transporter 2. Here, when the loader 4 loads objects to be loaded onto a plurality of transporters 2, that is, when objects to be loaded are loaded onto a plurality of transporters 2 by one loader 4, the storage unit 82 stores the respective values of the latest difference value data 82a, the cumulative difference value data 82b, the traveling load-amount measurement value data 82c, the loading load-amount measurement value data 82d, the measurement position data 82e, and the appropriate load-amount data 82f for each of the transporters 2.

The measurement position data 82e is the position information of the loader 4 that is acquired by the GPS information acquisition unit 76, that is, a position where objects to be loaded are loaded onto the transporter 2. It may be possible to associate the measurement result of a load amount with the loader 4 and the transporter 2, which are related with the measurement result, by storing the position information, which is the measurement position data 82e, in association with the measurement result of a load amount or the transporter 2 onto which objects are to be loaded. Meanwhile, the time when the position information is acquired is stored, so that the measurement position data 82e may be associated with the measurement result of a load amount or the transporter 2 onto which objects are to be loaded.

<Structure of Display Device of Loader>

Figure 8:
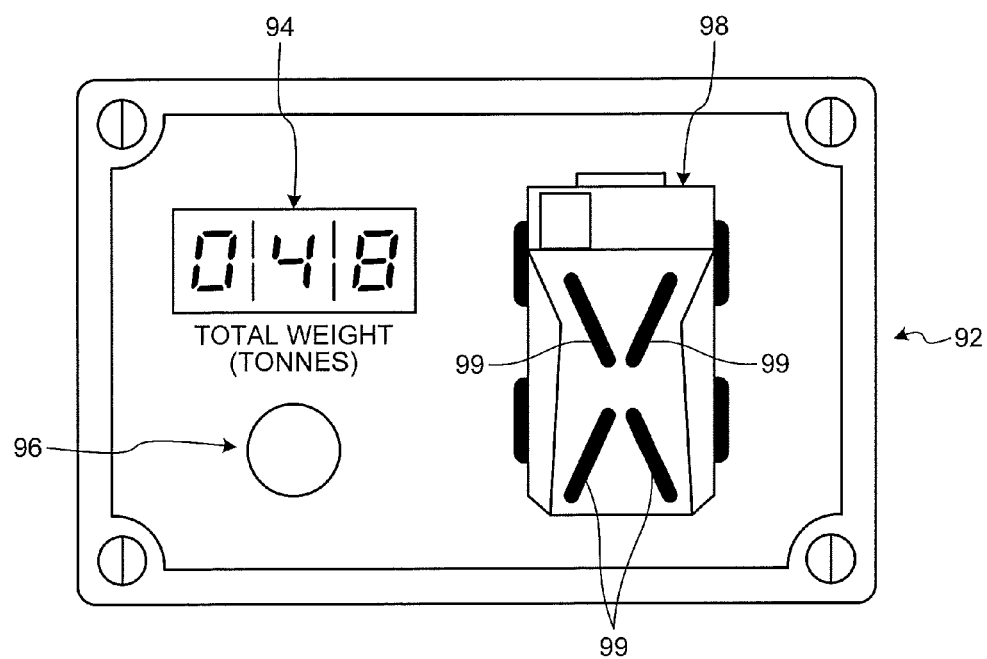
FIG. 8 is a view illustrating an example of a display device of the loader.

FIG. 8 is a view illustrating an example of the display device 52 of the loader 4. The display device 52 will be described below with reference to FIGS. 7 and 8. The display device 52 includes a display control unit 90 and a display unit 92 as illustrated in FIG. 7. The display control unit 90 controls the image that is displayed on the display unit 92. The display control unit 90 creates an image displayed on the display unit 92 by converting an output signal such as data, which is output from the computing unit 80 or the storage unit 82, into an image signal.

The display unit 92 is a liquid crystal display, an organic EL display, or the like, and displays an image that is created by the display control unit 90. As illustrated in FIGS. 7 and 8, the display unit 92 includes a load-amount display portion 94, an alarm display portion 96, and a transporter-state display portion 98. The load-amount display portion 94 is a screen area that displays the corrected load amount calculated by the load-amount correcting unit 80b. Since the load-amount display portion 94 includes three columns displaying numerical values, the load-amount display portion 94 can display a three-digit number. A numerical value of the corrected load amount, which is calculated by the computing unit 80, is displayed in the load-amount display portion 94. Here, since the load-amount display portion 94 illustrated in FIG. 8 shows a case where the numerical value of the corrected load amount is 48 ton, "0", "4", and "8" are displayed from the left in this order. The loader 4 can notify an operator, who operates the loader 4, of the current load amount by displaying the numerical value of the corrected load amount on the display device 52. When the current load amount becomes equal to or larger than a threshold value, the alarm display portion 96 is turned on (or flickers) to notify an operator that there is a concern that overloading may occur or overloading is occurring. The threshold value is an appropriate load amount that is stored in the storage unit 82 of the loader 4 or the storage unit 62 of the transporter 2. The transporter-state display portion 98 displays the state of the transporter 2 onto which objects are loading objects to be loaded. The state of the transporter 2 means whether or not the abnormality of, for example, the pressure sensor 20 occurs. The transporter-state display portion 98 visually displays the pressure sensors 20 where abnormalities occur, based on information, which is received through the communicators 26 and 50, about the occurrence of the abnormalities of the pressure sensor 20 of the transporter 2. For example, the display control unit 90 makes loading distribution signals 99, which correspond to the pressure sensors 20 where abnormalities occur, flicker. Further, the transporter-state display portion 98 receives detection values from the respective pressure sensors 20, and displays the magnitudes of the detection values, which are detected by the respective pressure sensors 20, in a plurality of color levels by the loading distribution signals 99 as illustrated in FIG. 8. That is, the operator of the loader 4 can checks whether or not objects loaded into the vessel 12 are uniformly loaded by visually recognizing the loading distribution signals 99.

<Control Operation of Loading System>

Figure 9:
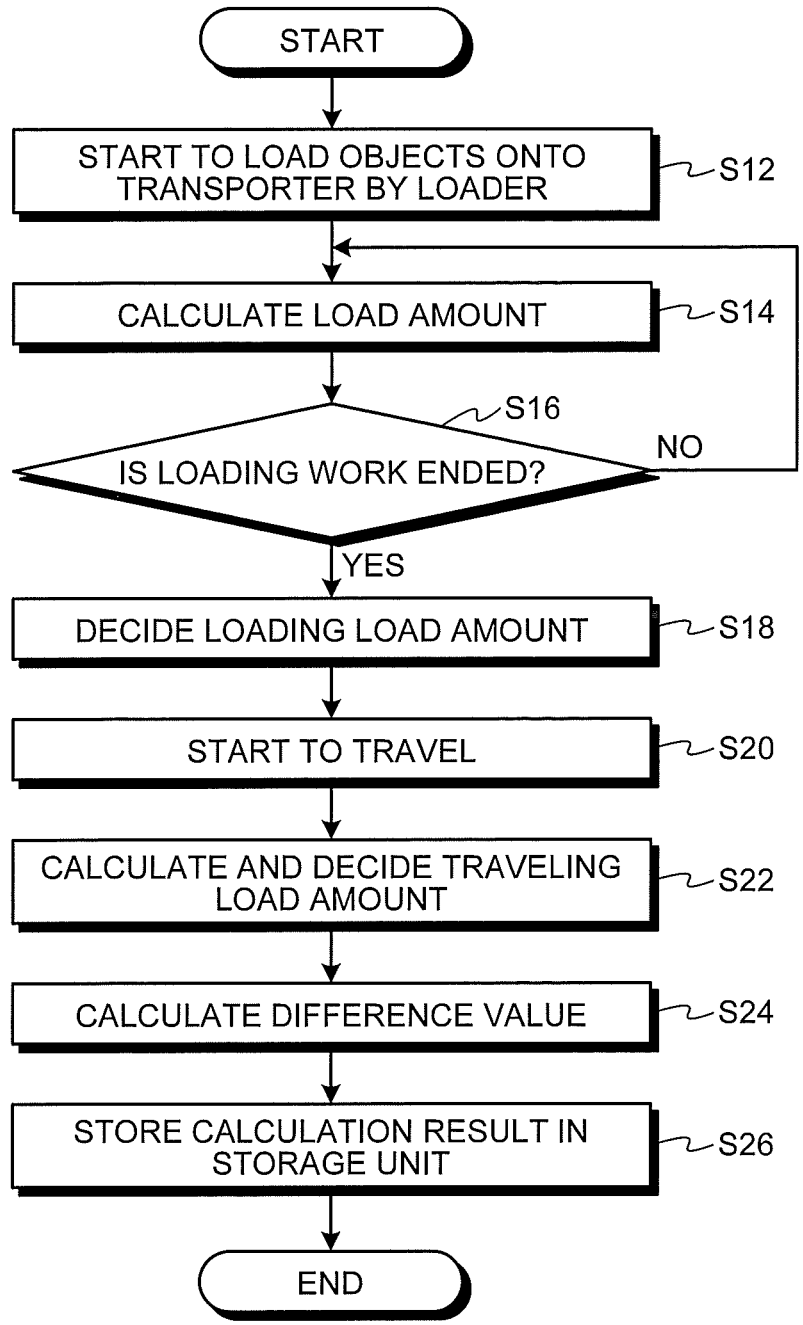
FIG. 9 is a flowchart illustrating an example of a control operation of the loading system.
Figure 10:
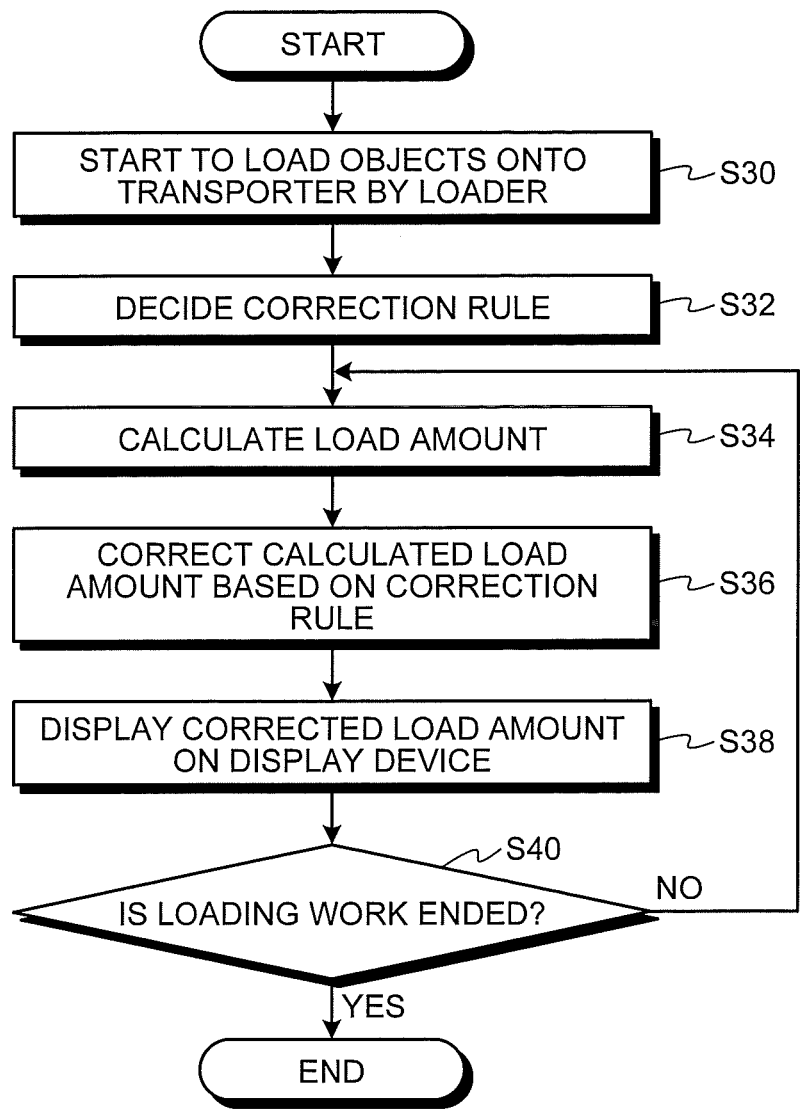
FIG. 10 is a flowchart illustrating an example of a control operation of the loading system.

FIGS. 9 and 10 are flowcharts illustrating examples of a control operation of the loading system. The control operation of the loading system will be described below with reference to FIGS. 9 and 10. An operation for calculating a difference value, which is used as a criterion for determining a correction rule, will be described first with reference to FIG. 9. Meanwhile, the processing illustrated in FIG. 9 may be performed by any one of the computing units 60 and 80, but a case where the processing is performed by the computing unit 60 will be described.

The loading system 1 detects that objects start to be loaded onto the transporter 2 by the loader 4, in step S12. Meanwhile, the loading system 1 can detect that objects start to be loaded onto the transporter 2 by the loader 4, by determining a relative positional relation between the loader 4 and the transporter 2, the change of a load amount of the transporter 2, an operation of the loader 4, or the like. That is, the change of a load amount of the transporter 2 is the change of a load amount that is detected by the pressure sensor 20. When the increase of a load amount is detected, the loading system 1 determines that objects start to be loaded. The determination condition of the start of loading is not limited thereto. Here, the transporter 2 stops for a predetermined time during a loading work. The loading system 1 may determine that loading is started based on this, if detecting the stop of the transporter 2 from the vehicle speed that is calculated using the detection results of the rotation sensors 18. Further, each of the loader 4 and the transporter 2 acquires position information by GPSs. The loading system 1 may allow the loader 4 and the transporter 2 to communicate with each other using position information, determine whether or not positions representing the position information are within a predetermined distance, and determine that loading is started when the positions are within the predetermined distance. The loading system 1 may use any one of the above-mentioned conditions as the determination condition of the start of loading, and may use the satisfaction of a plurality of conditions as the determination condition of the start of loading.

If the loading system 1 determines that loading is started in step S12, the loading system 1 calculates a load amount in step S14. Here, it is possible to calculate the load amount by performing processing with the pressure sensors 20, the pressure sensor value totalizing unit 60a, and the load-amount calculating unit 60b as described above. Meanwhile, the load amount calculated in step S14 is used when a display is performed on the display devices 28, 28a, and 52 to be described below.

If the loading system 1 calculates a load amount in step S14, the loading system 1 determines whether or not the loading work is ended in step S16. The loading system 1 detects the state of a machine, such as an operation signal of the loader 4, an operation signal of the transporter 2, or an operating signal input by an operator; and can determine whether or not the loading work is ended, by making a determination based on the detection result. For example, the operator of the loader 4 notifies the end of the loading work by sounding an alarm (horn) when the operator of the loader 4 ends the loading work, or transmitting a voice for giving a command to the transporter 2 by radio communication; and the operator of the loader 4 sends a signal, which means the determination of the end of the loading work, to the transporter-side in-vehicle device 30 by operating a predetermined operation button. Alternatively, if a rate of increase in the load amount detected by the pressure sensors 20 within a predetermined time is zero, the loading system may determine the end of the loading work. If the loading system 1 determines that the loading work is not ended (No) in step S16, processing returns to step S14. If the loading system 1 determines that the loading work is ended (Yes) in step S16, the loading system 1 determines and stores a loading load amount in step S18. When the loading system 1 determines that the loading work is ended if a rate of increase in the load amount detected by the pressure sensors 20 within a predetermined time is zero, the loading system 1 may calculate a load amount again in step S18. However, since a value is not changed basically from the latest calculated value calculated in step S14, the latest calculated value calculated in step S14 may be used as a loading load amount. When the loading system determines the end of the loading work based on another determination criterion, it is preferable that a load amount newly calculated in step S18 be calculated as a loading load amount. Further, the loading system 1 may calculate a loading load amount after determining that the loading work is ended in step S16 without calculating a load amount in step S14. Meanwhile, although being described below, the loading system 1 also calculates a loading load amount regardless of step S14 by processing different from the processing of FIG. 9 in order to display a loading load amount.

The loading system 1 determines a loading load amount in step S18, detects the start of travel in step S20, and measures, calculates, determines, and stores a traveling load amount in step S22. That is, when the transporter 2 detects the start of travel after a loading load amount is determined, the loading system 1 calculates a load amount and uses the calculated load amount as a traveling load amount. The transporter 2 can detect the start of travel by various methods. For example, the transporter 2 may determine that travel is started if the rotation sensors 18 detect a predetermined vehicle speed. Further, the transporter 2 detects the operation of a shift lever or an accelerator pedal, which is performed by an operator, by an electrical signal, and may determine that travel is started based on the electrical signal. Meanwhile, it is preferable that the timing of the measurement of a traveling load amount performed in step S22 be when the transporter 2 stably travels. That is, when the transporter 2 starts to travel and accelerate or decelerates using a brake so as to stop, loads caused by the acceleration or deceleration are applied to the suspension cylinders 16. Accordingly, the pressure sensors 20 output detection values that are obtained by adding or subtracting a load to or from a net load amount. Furthermore, when the transporter turns along a traveling road by a steering operation, a load caused by the turning is applied to each of the suspension cylinders 16. Accordingly, the pressure sensors 20 also output detection values that are obtained by adding or subtracting a load to or from a net load amount. Moreover, the transporter 2 checks conditions for stable travel, such as whether or not a detection value of the vehicle speed detected by the rotation sensor 18 corresponds to constant speed travel, whether or not a steering angle sensor (not illustrated) shows linear travel, and whether or not the clinometer 22 determines that the transporter 2 is positioned on the flat road surface; and measures a traveling load amount at a timing when the condition is satisfied. Meanwhile, since the transporter 2 is provided with the GPS information acquisition unit 56, the transporter 2 determines whether or not the transporter 2 has traveled linearly and whether or not the transporter 2 has traveled on the flat road, by the change of the position information when the transporter 2 has traveled a predetermined distance. When these conditions for stable travel are satisfied, the loading system may calculate and determine a traveling load amount by using a load amount that is acquired when the transporter 2 has traveled a predetermined distance. Further, it is also possible to determine the measurement timing of a traveling load amount in the following manner. Information on a predetermined traveling road is stored in the storage unit 62, and position information of a zone, which allows stable travel, is further identified in the information on the predetermined traveling road. When position information, which is acquired by the GPS information acquisition unit 56 during the travel of the transporter 2, corresponds to the identified information of the zone that allows stable travel, a load amount is measured. As described above, the measurement timing of a traveling load amount is determined and an accurate traveling load amount is measured based on the states of a machine, such as the traveling state, the turning state, and the traveling position of the transporter 2 and the gradient of the traveling road. Meanwhile, it is preferable that the following method be used when the measurement result of a traveling load amount is calculated and determined in step S22. When the transporter 2 detects the start of travel in step S20, the loading system 1 measures a load amount at a predetermined sampling interval as long as the transporter 2 travels. For example, the measured value of a load amount, which is acquired in a predetermined period (a predetermined distance zone or a predetermined time) during travel, is subjected to statistical processing by the load-amount calculating unit 60b of the computing unit 60. That is, the frequency distribution (histogram) of measured values of a load amount, which are measured during travel, is obtained, and the median of the frequency distribution is determined as a traveling load amount (step S22). Even though an inaccurately measured value caused by the state of the road or the traveling state of the transporter 2 is acquired as a load amount measured during travel when this statistical processing is performed, it is possible to determine a traveling load amount by a statistical method. Accordingly, it is possible to ensure measurement accuracy. The loader 4 receives the measured value of a load amount, which is measured during travel, from the transporter 2, and the decision of a traveling load amount, which is performed using this statistical processing, may be performed by the computing unit 80 of the loader 4.

If the loading system 1 calculates and determines a traveling load amount in step S22, the loading system 1 calculates a difference value in step S24. That is, the loading system 1 calculates a difference between the loading load amount determined in step S18 and a traveling load amount determined in step S22 as a difference value. For example, when a difference value is denoted by $\Delta D$, a loading load amount is denoted by $D_0$, and a traveling load amount is denoted by $D_1$, "$\Delta D = D_0 - D_1$" is satisfied.

The loading system 1 calculates the difference value in step S24, stores the calculation result in the storage unit in step S26, and ends this processing. Here, the loading system 1 of this embodiment stores the loading load amount calculated in step S18, the traveling load amount determined in step S22, and the difference value calculated in step S24. The loading system 1 may store the calculation result in both the storage units 62 and 82, and may store the calculation result in only one of the storage units.

The loading system 1 can calculate a difference value between a loading load amount and a traveling load amount by performing the processing of FIG. 9.

Next, processing, which is performed during the processing for loading objects to be loaded onto the transporter 2 by the loader 4, specifically, processing for displaying a load amount on the display devices 28 and 52 will be described with reference to FIG. 10. Meanwhile, the loading system 1 can perform the processing of FIG. 10 and the processing of FIG. 9 in parallel. The processing of FIG. 10 is performed using the calculation result of the processing of FIG. 9 that is performed before the processing of FIG. 9 to be performed in parallel.

The loading system 1 detects that objects start to be loaded onto the transporter 2 by the loader 4, in step S30. If the loading system 1 detects the start of the loading of objects to be loaded in step S30, the loading system 1 determines a correction rule in step S32. The loading system 1 corrects a load amount, which is measured (detected by the pressure sensors 20) while the loader 4 performs the loading work, based on various measurement results and decision conditions including a difference value stored in the storage unit 62 or 82. Here, a rule, which subtracts a difference value from a load amount measured while the loading work is performed, may be used as the correction rule. That is, a rule, which satisfies "$D_R = D_M - \Delta D$" when the load amount measured while the loading work is performed is denoted by $D_M$, the difference value is denoted by $\Delta D$, and the corrected load amount is denoted by $D_R$, may be used.

Further, a rule, which calculates a converted difference value obtained by converting the sign of the difference value and adds the converted difference value to the load amount measured while the loading work is performed, may be used as the correction rule. In this case, when the converted difference value is denoted by $\Delta D'$, "$\Delta D' = -|\Delta D|$" is satisfied if "$\Delta D \geq 0$" is satisfied and "$\Delta D' = |\Delta D|$" is satisfied if "$\Delta D < 0$" is satisfied. Furthermore, when the load amount measured while the loading work is performed is denoted by $D_M$ and the corrected load amount is denoted by $D_R$, "$D_R = D_M + \Delta D'$" is satisfied. Moreover, the loading system 1 may calculate the difference value $\Delta D$ as $\Delta D = D_1/D_0$ and may calculate the correction rule as $D_R = D_M \times \Delta D$.

If the loading system 1 calculates the correction rule in step S32, the loading system 1 calculates a load amount in step S34, corrects the calculated load amount based on the correction rule in step S36, and displays the corrected load amount on the display device in step S38. If the loading system 1 displays the corrected load amount on the display devices 28 and 52 in step S38, the loading system 1 determines whether or not the loading work is ended in step S40. If the loading system 1 determines that the loading work is not ended (No), that is, if the loading system 1 determines that the loading work is continued, processing returns to step S34 and repeats the above-mentioned processing. If the loading system 1 determines that the loading work is ended (Yes) in step S40, the loading system 1 ends this processing (processing for displaying a load amount on the display devices 28 and 52).

As illustrated in FIG. 9, the loading system 1 measures a loading load amount and a traveling load-amount when the same objects to be loaded are loaded, and calculates a difference value based on the measured results. Moreover, as illustrated in FIG. 10, the loading system 1 determines a correction rule on a condition including the difference value calculated in FIG. 9, corrects the load amount, which is measured at the time of the loading work, using the determined correction rule, and displays the corrected load amount on the display devices 28 and 52.

Here, since the load amount, which is measured at the time of the loading work, is measured while the suspension cylinder 16 of the transporter 2 stops, the load amount measured at the time of the loading work is significantly affected by the static friction resistance of the suspension cylinder 16 and an error of a value measured by the pressure sensor 20 is increased. In contrast, since the load amount, which is measured at the time of the travel, is measured while the suspension cylinder 16 changes, the pressure sensor 20 can detect a more accurate measured value. The loading system 1 can more accurately measure a load amount at the time of a loading work by correcting the load amount, which is measured at the time of the loading work, using this event based on the difference value between the loading load amount and the traveling load amount. That is, it is possible to correct the error, which occurs when measurement is performed in a stop state, by correcting the load amount, which is measured at the time of the loading work, based on a difference value between a loading load amount and a traveling load amount that are measured when the same objects to be loaded are loaded. As a result, the loading system 1 can correct the characteristics of each of the transporters 2 by feedback processing, so that the loading system 1 can calculate a more accurate load amount.

The operator of the loader 4 can adjust the load amount by operating the working unit 44 while visually recognizing the corrected load amount that is displayed on the display device 28 or 52 of the transporter 2 or the loader 4 at the time of the loading work. That is, the operator of the loader 4 or the operator of the transporter 2 receives an offer of an accurate load amount, and can perform the more accurate management of a load amount. Accordingly, the operator of the loader 4 can suppress the occurrence of underloading and overloading and can load the objects to be loaded of which a load amount (appropriate load amount) is close to a rated value onto the transporter 2. In this way, the loading system 1 can improve productivity and suppress the occurrence of the damage or accident of the transporter 2 caused by overloading by loading a load amount, which is close to a rated value, onto the transporter 2.

<Modification of Embodiment>

Meanwhile, the invention is not limited to the above-mentioned embodiment, and includes modifications, alterations, and the like without departing from the range where an object of the invention can be achieved. For example, the transporter 2 is provided with the display device 28 and the loader 4 is provided with the display device 52 in the above-mentioned embodiment, but at least one of the display devices 28 and 52 may be provided and only one display device may be provided. Meanwhile, the loading system 1 may be adapted to display a corrected load amount on both the display devices 28 and 52.

The loading system 1 may be provided with at least one of the difference value computing units 60c and 80a, and may be provided with only one difference value computing unit. The loading system 1 may perform the same calculation by the difference value computing units 60c and 80a. Likewise, the loading system 1 may be provided with at least one of the load-amount correcting units 60d and 80b, and may be provided with only one load-amount correcting unit. The loading system 1 may perform the same calculation by the load-amount correcting units 60d and 80b.

It is preferable that the loading system 1 be provided with the load-amount correcting unit 80b when being provided with the difference value computing unit 80a. Accordingly, it is possible to process the result, which is calculated by the difference value computing unit 80a, by the computing unit 80 without sending the result, which is calculated by the difference value computing unit 80a, to the computing unit 60 again. Further, it is preferable that the loading system 1 be provided with the difference value computing unit 60c when being provided with the load-amount correcting unit 60d. Accordingly, it is possible to correct the difference value, which is calculated by the computing unit 80, based on the difference value, which is calculated by the computing unit 60, without sending the difference value, which is calculated by the computing unit 80, to the computing unit 60.

It is preferable that the loading system 1 calculate a difference value by the difference value computing unit 60c. Accordingly, it is possible to calculate a difference value immediately after measuring a load amount by the transporter 2. Moreover, it is possible to more reliably terminate the calculation of the difference value before the next loading work.

The loading system 1 may output the information about the corrected load amount, which is calculated by the load-amount correcting unit 60d, to the loader 4 through the communicators 26 and 50 and display the corrected load amount on the display device 52. Further, the loading system 1 may store the data of the difference value, which is calculated by the difference value computing unit 60c, in the storage unit 82; correct the load amount, which is measured at the time of the loading work by the transporter 2, by the load-amount correcting unit 80b; and display the corrected load amount on the display device 52.

The loading system 1 may display the corrected load amount, which is calculated by the load-amount correcting unit 60d, on the display device 28. In this case, the loading system 1 can notify the operator of the loader 4 of the corrected load amount even though the loader 4 is not provided with each part of each storage unit 82 of the computing unit 80.

When calculating the difference value by the difference value computing unit 80a, the loading system 1 may include at least one of the traveling load-amount measurement value data 66a and 82c and may include only one of the traveling load-amount measurement value data. Likewise, the loading system 1 may include at least one of the loading load-amount measurement value data 66b and 82d and may include only one of the loading load-amount measurement value data.

It is preferable that the loading system 1 determine the correction rule based on the difference value that is processed by the difference value processing unit 80d. The loading system 1 can more accurately correct the load amount by determining the correction rule based on the processed difference value. The computing unit 60 of the loading system 1 may also be provided with unit corresponding to the load-amount determining unit 80c and the difference value processing unit 80d of the computing unit 80.

The loading system 1 may perform the calculation (step S24) of the difference value illustrated in FIG. 9 whenever the loading work is performed by the loader 4, and may perform the calculation whenever the loading work is performed a predetermined number of times. Further, when the loading system 1 calculates difference values of the predetermined number of times of the loading work and can determine that the variation of the difference value converges in a predetermined range, the loading system 1 may reduce the frequency of the calculation of the difference value.

Figure 11:
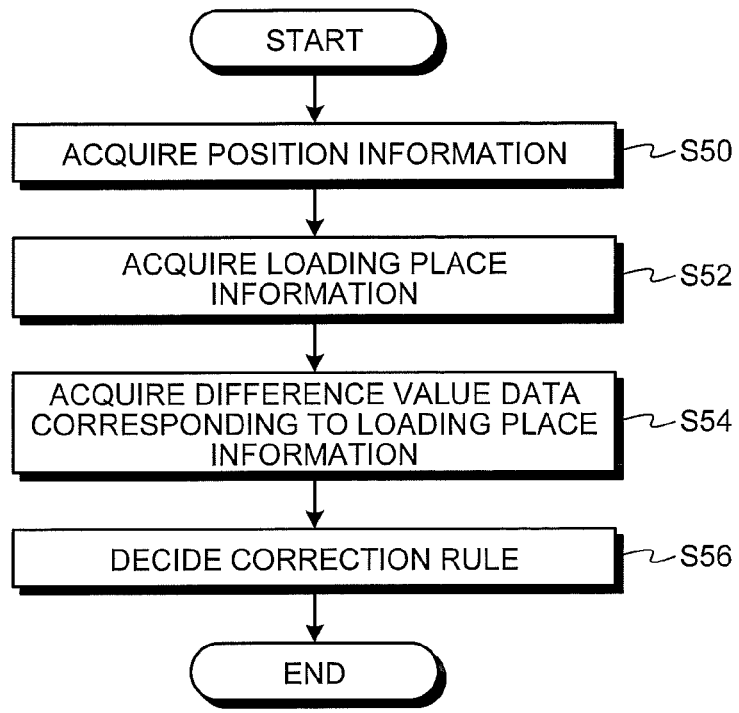
FIG. 11 is a flowchart illustrating an example of a control operation of the loading system.

FIG. 11 is a flowchart illustrating an example of a control operation of the loading system. Processing illustrated in FIG. 11 is an example of the processing of step S32 of FIG. 10, that is, the decision of a correction rule. The loading system 1 acquires position information in step S50. It is possible to acquire the position information through position measurement that is performed by the GPS information acquisition units 56 and 76. If the loading system 1 acquires position information in step S50, the loading system 1 acquires loading place information based on the acquired position information in step S52. Here, the loading place information is information representing an area of the loading place (an area of the position information). That is, the area of the loading place represents a loading place, which corresponds to the kind (quality of soil) of an object serving as an object to be loaded, such as a coal quarry or an iron ore quarry, in the case of, for example, a mine. The loader 4 performs a loading work without significantly moving in the loading place for a certain period. Accordingly, the position information, which represents an area in a predetermined range of a place that is known as the loading place, may be stored in the storage units 62 and 82 as loading place information in advance; and the GPS information acquisition unit 76 of the loader 4 regularly measures its own position information and a predetermined area including obtained position information may be stored in the storage units 62 and 82 as loading place information.

If the loading system 1 acquires loading place information in step S52, the loading system 1 acquires difference value data corresponding to the loading place information in step S54. The loading system 1 associates the loading place information with the difference value data, and stores the loading place information and the difference value data in the storage units 62 and 82. When acquiring difference values, the loading system 1 assorts the difference values in regard to a plurality of loading places in association with the loading place information related with the calculation of the difference values. For example, if the transporter 2 performs a loading work in a plurality of loading places, the transporter 2 obtains difference values corresponding to the respective loading places and stores the difference values corresponding to the loading places (loading place information). Further, when the transporter 2 reaches a certain loading place and starts to perform a loading work, the loading system 1 measures the information on the current position of the transporter 2 and reads the loading place information, which represents a place close to the obtained position information, from the storage units 62 and 82. Since difference value data is associated with the loading place information, difference value data to be used at the loading place are simultaneously read out from the read loading place information. The loading system 1 acquires the difference value data in step S54, determines a correction rule in step S56, and ends this processing (processing for determining the correction rule).

That is, as illustrated in FIG. 11, the loading system 1 can use a correction rule corresponding to the condition of the quality of soil at a loading place by acquiring position information and acquiring difference value data corresponding to the loading place. Accordingly, the operator of the loader 4 can perform the more accurate management of a load amount by further improving the measurement accuracy of the amount of objects that are loaded onto the transporter 2 by the loader 4. Moreover, the loading system 1 separately accumulates difference values corresponding to the respective loading places by detecting the position information on the loading place and using the position information. Accordingly, since a difference value related to the condition of the quality of soil at a loading place is obtained, it is possible to determine a correction rule suitable for the quality of soil at the loading place. As a result, it is possible to improve the measurement accuracy of a load amount.

Figure 12:
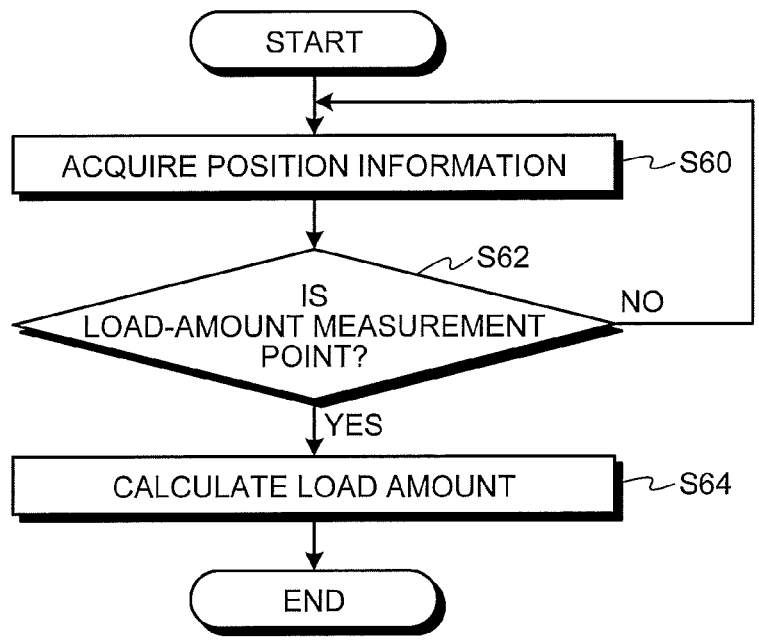
FIG. 12 is a flowchart illustrating an example of a control operation of the loading system.

FIG. 12 is a flowchart illustrating an example of a control operation of the loading system 1. Processing illustrated in FIG. 12 is an example of the processing of step S22 of FIG. 9, that is, the calculation of a traveling load amount, and corresponds to a case where the determination of the measurement timing of the above-mentioned traveling load amount is performed using a determination element referred to as a load-amount measurement point. Meanwhile, it is preferable that the processing illustrated in FIG. 12 be performed by the computing unit 60. The loading system 1 acquires position information in step S60. The position information can be acquired by the position measurement of the GPS information acquisition unit 56.

If the loading system 1 acquires position information in step S60, the loading system 1 determines whether or not a point is a load-amount measurement point in step S62. Here, the load-amount measurement point is a predetermined measurement area of a traveling load-amount. If the loading system 1 determines that a point is not the measurement point (No) in step S62, processing returns to step S60. If the loading system 1 determines that a point is the load-amount measurement point (Yes) in step S62, the loading system 1 calculates a load amount in step S64, uses the calculated load amount as a traveling load amount, and ends this processing. Meanwhile, when the loading system 1 determines that a point is the load-amount measurement point, the loading system 1 determines whether or not the loading system is traveling. The loading system 1 calculates a load amount only when the loading system is traveling, and may use the calculated load amount as a traveling load amount.

As illustrated in FIG. 12, the loading system 1 measures and acquires position information and can perform standardization of the measurement of a traveling load amount by measuring a traveling load amount when traveling in a predetermined area. Accordingly, it is possible to perform measurement with higher accuracy. Further, since a predetermined load-amount measurement point is based on the premise of a travel area where the measurement accuracy of a traveling load amount is high, it is possible to accurately measure a load amount.

The loading system 1 continuously acquires and accumulates a load amount and position information at an interval of a constant travel distance and may perform the same processing as the processing of FIG. 12 as post-processing for the acquired information. In this case, the computing unit 80 can also perform the same processing.

Figure 13:
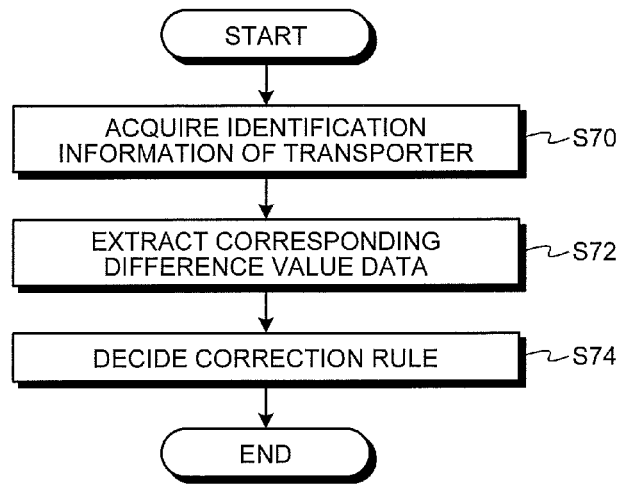
FIG. 13 is a flowchart illustrating an example of a control operation of the loading system.

FIG. 13 is a flowchart illustrating an example of a control operation of the loading system 1. Processing illustrated in FIG. 13 is an example of the processing of step S32 of FIG. 10, that is, the decision of a correction rule. Here, the processing illustrated in FIG. 13 is performed by the computing unit 80. The loading system 1 acquires the identification information (for example, ID) of transporters 2 in step S70. The identification information of the transporters 2 is stored in the storage unit 62 of each transporter 2. That is, the computing unit 80 specifies a transporter onto which objects to be loaded are to be loaded, and acquires the identification information of the transporter. The computing unit 80 can identify the transporters 2 by communicating with the transporters 2, onto which objects are to be loaded, through the communicators 50 to acquire the ID and the like of the transporters 2.

If the loading system 1 acquires the identification information of the transporters 2 in step S70, the loading system 1 extracts difference value data corresponding to the acquired transporters 2 in step S72. The loading system 1 stores difference value data (the latest difference value data 82a and the cumulative difference value data 82b), which correspond to the respective transporters 2 operating in the site where a loading work is performed, in the storage units 62 and 82. Accordingly, difference value data, which were obtained in the past by the loading of objects onto the transporters 2 and the travel of the transporter after the loading, are acquired from the acquired identification information of the transporters 2. If the loading system 1 acquires the difference value data in step S72, the loading system 1 determines a correction rule in step S74 and ends this processing (processing for determining the correction rule).

As illustrated in FIG. 13, the loading system 1 can determine a correction rule, which corresponds to the characteristics of each transporter 2, by acquiring the identification information of the transporters 2 and determining a correction rule from the difference value data of each transporter 2. Accordingly, it is possible to improve the measurement accuracy of a load amount.

Figure 14:
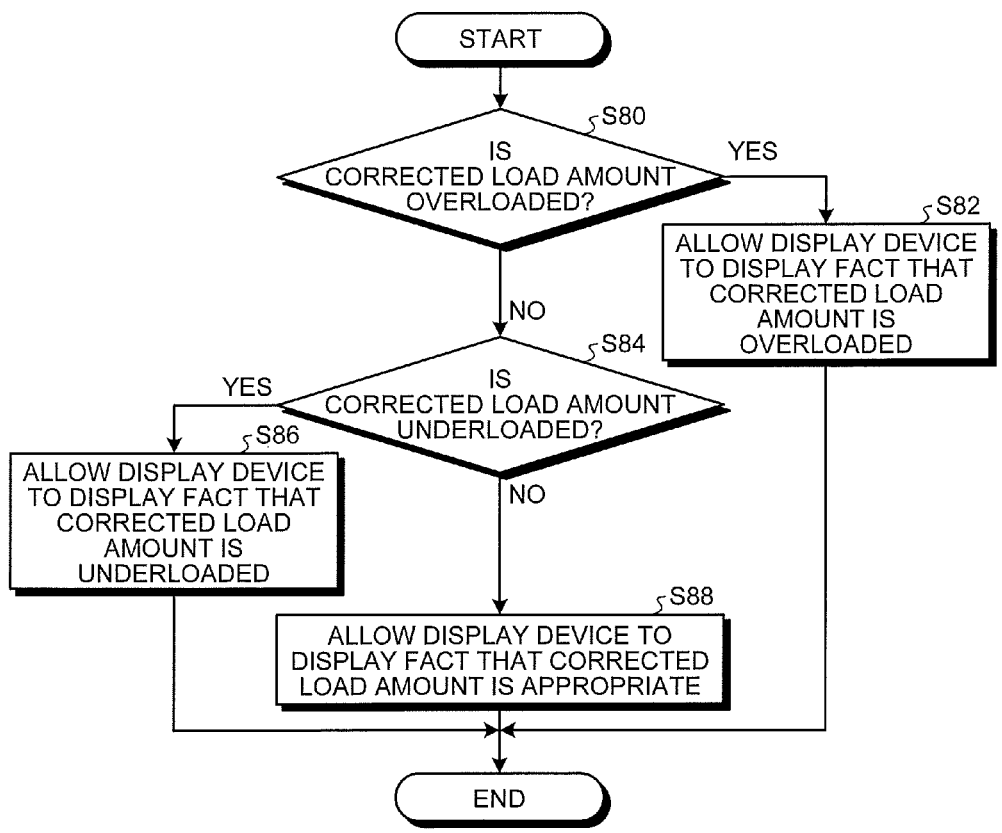
FIG. 14 is a flowchart illustrating an example of a control operation of the loading system.

FIG. 14 is a flowchart illustrating an example of a control operation of the loading system 1. Processing illustrated in FIG. 14 is an example of the flow of a treatment for evaluating a corrected load amount when the corrected load amount is displayed on the display device 52 in the processing of step S38 of FIG. 10. The loading system 1 may display the corrected load amount by a numerical value, but may control the display of the above-mentioned display device 28a or the above-mentioned alarm display portion 96 so as to display an evaluation result, which represents whether the corrected load amount is overloaded, underloaded, or appropriate, by the display form illustrated in FIG. 6. Further, a voice output unit may be provided in the driver's cab of the loader 4; an output signal, which represents the evaluation result of a load amount, may be sent to the voice output unit from the load-amount determining unit 80c; and a voice output signal may be converted into a voice signal to notify an operator with a voice.

The loading system 1 determines whether or not the corrected load amount is overloaded in step S80. The determination of whether or not the corrected load amount is overloaded may be performed through the comparison between the magnitudes of the above-mentioned appropriate load-amount data 66d and 82f and the corrected load amount. If the loading system 1 determines that the corrected load amount is overloaded (Yes) in step S80, the loading system 1 allows the display device 28 to display a fact that the corrected load amount is overloaded in step S82 and ends this processing (processing for evaluating the corrected load amount). If the loading system 1 determines that the corrected load amount is not overloaded (No) in step S80, processing proceeds to step S84 and the loading system 1 determines whether or not the corrected load amount is underloaded. If the loading system 1 determines that the corrected load amount is underloaded (Yes) in step S84, the loading system 1 allows the display device 28 to display a fact that the corrected load amount is underloaded in step S86 and ends this processing (processing for evaluating the corrected load amount). If the loading system 1 determines that the corrected load amount is not underloaded (No) in step S84, processing proceeds to step S88, the loading system 1 allows the display device 28 to display a fact that the corrected load amount is appropriate, and ends this processing (processing for evaluating the corrected load amount). That is, the load-amount determining unit 80c determines whether or not the corrected load amount is overloaded or underloaded. If the corrected load amount is overloaded, the load-amount determining unit 80c outputs an output signal, which represents this, to the display device 52. If the corrected load amount is underloaded, the load-amount determining unit 80c outputs an output signal, which represents this, to the display device 52. Meanwhile, if the load-amount determining unit 80c determines that the corrected load amount is not overloaded or underloaded and is within a tolerance range of an appropriate load amount, the load-amount determining unit 80c outputs an output signal, which represents this, to the display device 52. A fact that the corrected load amount is overloaded is displayed on the alarm display portion 96 of the display unit 94 of the display device 28 by a message, a sign, or the like.

The loading system 1 can suppress the occurrence of underloading and overloading of the objects to be loaded, by displaying whether the corrected load amount is overloaded, underloaded, or appropriate as illustrated in FIG. 14; and can load the objects to be loaded of which a load amount (appropriate load amount) is close to a rated value onto the transporter 2.

Further, the transporter 2 of the embodiment displays a load amount on the display device 28 or sends a load amount to the communicator 50 of the loader 4 by the communicator 26, but is not limited thereto. The transporter 2 can output the calculated load amount by various output units. Furthermore, an output destination, when the transporter 2 outputs an output signal by communication, is not limited to the loader, and may be other communicators, for example, a management unit that manages the loading system 1.

REFERENCE SIGNS LIST

1 LOADING SYSTEM
2 TRANSPORTER
4 LOADER
11 VEHICLE BODY
12 VESSEL
14 WHEEL
16 SUSPENSION CYLINDER
18 ROTATION SENSOR
20 SUSPENSION PRESSURE SENSOR
22 CLINOMETER
24, 48 GPS ANTENNA
26, 50 COMMUNICATOR
26a, 50a COMMUNICATION ANTENNA
28, 52 DISPLAY DEVICE
30 TRANSPORTER-SIDE IN-VEHICLE DEVICE (CONTROLLER)
41 CRAWLER BELT
42 UPPER TURNING BODY
44 WORKING UNIT
44a BOOM
44b ARM
44c BUCKET
54 LOADER-SIDE IN-VEHICLE DEVICE (CONTROLLER)
56, 76 GPS INFORMATION ACQUISITION UNIT
58, 78 DATA TRANSCEIVER 60, 80 COMPUTING UNIT
60a PRESSURE SENSOR VALUE TOTALIZING UNIT
60b LOAD-AMOUNT CALCULATING UNIT
60c, 80a DIFFERENCE VALUE COMPUTING UNIT
60d, 80b LOAD-AMOUNT CORRECTING UNIT
62, 82 STORAGE UNIT
66 LOAD-AMOUNT INFORMATION TABLE
66a, 82c TRAVELING LOAD-AMOUNT MEASUREMENT VALUE DATA
66b, 82d LOADING LOAD-AMOUNT MEASUREMENT VALUE DATA
66d, 82f APPROPRIATE LOAD-AMOUNT DATA
66c DIFFERENCE VALUE DATA
68, 82e MEASUREMENT POSITION DATA
80c LOAD-AMOUNT DETERMINING UNIT
80d DIFFERENCE VALUE PROCESSING UNIT
82a LATEST DIFFERENCE VALUE DATA
82b CUMULATIVE DIFFERENCE VALUE DATA
90 DISPLAY CONTROL UNIT
92 DISPLAY UNIT
94 LOAD-AMOUNT DISPLAY PORTION
96 ALARM DISPLAY PORTION
99 LOADING DISTRIBUTION SIGNAL

The invention claimed is:

1. A loading system that includes a transporter and a loader, the loading system comprising:
   a load-amount measuring unit installed on the transporter that measures a load amount of an object loaded on the transporter;
   a pressure sensor that detects a load applied to a suspension cylinder of the transporter, an amount of the load fluctuating depending on a static friction resistance of the suspension cylinder, wherein the load-amount measuring unit measures the load amount of the object loaded on the transporter, based on the amount of the load detected by the pressure sensor;
   a detecting unit that detects a start of travel of the transporter;
   a difference computing unit that computes a difference between the load amount, which is measured by the load-amount measuring unit when the object is loaded, and a load amount that is measured by the load-amount measuring unit after a measurement when the object is loaded and after a detection of the start of travel of the transporter by the detecting unit;
   a storage unit that stores a difference value data indicating the difference computed by the difference computing unit;
   a correcting unit that corrects the load amount, which is measured by the load-amount measuring unit when the object is loaded, based on a correction rule calculated based on the difference value data stored in the storage unit; and
   a display unit that displays a corrected load amount obtained by correcting the load amount by the correcting unit.

2. The loading system according to claim 1,
   wherein a difference value is processed based on a plurality of the difference value data stored in the storage unit to determine the correction rule, and
   the load amount, which is measured by the load-amount measuring unit when the object is loaded, is corrected based on the correction rule.

3. The loading system according to claim 1, further comprising:
   a transporter-side communication section that is installed on the transporter; and
   a loader-side communication section that is installed on the loader and communicates with the transporter-side communication section,
   wherein the display unit is installed in a driver's cab of the loader.

4. The loading system according to claim 3,
   wherein the correcting unit is installed on the loader,
   the transporter-side communication section sends information on the load amount, which is measured by the load-amount measuring unit when the object is loaded, to the loader-side communication section, and
   the loader-side communication section outputs the information on the load amount to the correcting unit.

5. The loading system according to claim 4,
   wherein the difference computing unit and the storage unit are installed on the loader, and
   the transporter-side communication section sends the information on the load amount, which is measured by the load-amount measuring unit when the object is loaded, and the load amount, which is measured by the load-amount measuring unit after the measurement when the object is loaded and at the time of traveling, to the loader-side communication section.

6. The loading system according to claim 1,
   wherein the difference computing unit, the storage unit, and the correcting unit are installed on the transporter, and
   the display unit is installed on any one of the outside of the transporter and a driver's cab of the loader.

7. The loading system according to claim 1, further comprising:
   a position detecting unit on at least one of the transporter and the loader,
   wherein the difference computing unit assorts the difference values for areas of position information where the load amount is measured when the object is loaded,
   the storage unit stores the assorted difference values,
   the correcting unit determines the correction rules for areas of position information where the load amount is measured when the object is loaded, and
   the correcting unit reads out the difference value corresponding to a loading place, which is detected by the position detecting unit when the object is loaded, from the storage unit to correct the load amount, which is measured by the load-amount measuring unit when the object is loaded.

8. The loading system according to claim 7,
   wherein the position detecting unit is installed on the transporter, and
   the load-amount measuring unit measures the load amount at the time of traveling if the position information detected by the position detecting unit indicates a predetermined position.

9. The loading system according to claim 1,
   wherein the load-amount measuring unit determines a measurement timing according to a state of the transporter to measure the load amount at the time of traveling.

10. The loading system according to claim 1,
    wherein the display unit displays an evaluation result corresponding to evaluation that is performed by a load-amount determining unit that evaluates the load amount corrected by the correcting unit.

11. A transporter on which an object is loaded, the transporter comprising:
    a load-amount measuring unit that measures a load amount of the loaded object;

a pressure sensor that detects a load applied to a suspension cylinder of the transporter, an amount of the load fluctuating depending on a static friction resistance of the suspension cylinder, wherein the load-amount measuring unit measures the load amount of the object loaded on the transporter, based on the amount of the load detected by the pressure sensor;

a detecting unit that detects a start of travel of the transporter;

a difference computing unit that computes a difference between the load amount, which is measured by the load-amount measuring unit, and a load amount that is measured by the load-amount measuring unit after a measurement when the object is loaded and after a detection of the start of travel of the transporter by the detecting unit;

a storage unit that stores a difference value data indicating the difference computed by the difference computing unit;

a correcting unit that corrects the load amount, which is measured by the load-amount measuring unit when the object is loaded, based on a correction rule calculated based on the difference value data stored in the storage unit; and a pressure sensor that detects a load applied to a suspension cylinder of the transporter, wherein the load-amount measuring unit measures the load amount of the object loaded on the transporter, based on a detection result of the pressure sensor.

12. The transporter according to claim 11, further comprising an output unit that outputs a corrected load amount obtained by correcting the load amount by the correcting unit.

13. The transporter according to claim 12, wherein the output unit is a display unit that displays the corrected load amount.

14. The transporter according to claim 12, wherein the output unit is a communication section that outputs the corrected load amount.

15. The transporter according to claim 14, wherein the communication section outputs the corrected load amount to a loader that loads the object.

* * * * *